United States Patent Office 3,470,094
Patented Sept. 30, 1969

3,470,094
COMPOSITIONS FOR PREPARING HEAT-CURABLE FIRE RETARDANT MOLDING COMPOSITIONS
Rolf Zimmermann, Wolfram Ernst Busch, and Fritz Reiners, Wiesbaden-Biebrich, Germany, assignors to Chemische Werke Albert, Wiesbaden-Biebrich, Germany, a corporation of Germany
No Drawing. Original application July 13, 1965, Ser. No. 471,745, now Patent No. 3,361,847, dated Jan. 2, 1968. Divided and this application Apr. 10, 1967, Ser. No. 642,271
Claims priority, application Germany, July 16, 1964, C 33,423, C 33,424; June 18, 1965, C 36,145
Int. Cl. C09k 3/28
U.S. Cl. 252—8.1                 1 Claim

ABSTRACT OF THE DISCLOSURE

Compositions for preparing heat-curable moulding compositions comprising a powdery inorganic filler and a fire-retardant additive from the group (A) 1,3,5-s-tris-(dihalopropionyl) - hexahydrotriazine, (B), a mixture thereof with perchlorocyclo - $(5,2,1,0^{2,6},0^{3,9},0^{5,8})$decane, (C) a hexahydrotriazine derivative of the formula

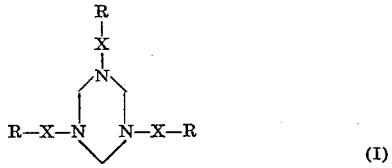

(I)

in which X is a member selected from the group consisting of $>C=O$ and $>SO_2$ and at least one of the radicals R is the group

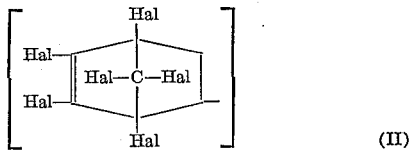

(II)

Hal being bromine or chlorine and the other radicals R the group $-CH=CH_2$ and (D) a mixture of a plurality of components (A), (B) and (C).

PRIOR APPLICATIONS

This application is a divisional application of copending, commonly assigned U.S. patent application Serial No. 471,745, filed July 13, 1965, and now U.S. Patent No. 3,361,847.

PRIOR ART

It is known that moulded articles based on unsaturated polyester resins often have low fire resistance. It is a prerequisite for fire-retardant additives that they should affect the properties of the material into which they are incorporated as little as possible, whilst at the same time give the optimum effect with regard to the flame resistance. A particular problem is for example the addition of flame resistant substances to moulding compositions based on synthetic resins, especially if the moulded products have to be self-extinguishing on removal of a source of heat and also to have good electric properties, such as a satisfactory surface leakage strength.

In practice flame resistant moulding compositions based on synthetic resins were hitherto prepared in various ways. The known moulding compositions, however, have serious disadvantages. Thus, when using halogen-containing unsaturated polyesters one is tied to the properties of the resin used. The extent of the flame resistance of the material is dependent on the halogen content of the polyester, whereby the proportions of the starting components necessary for the manufacture of the resin are virtually unalterable. Additional properties which may be attained only by varying the nature of the dicarboxylic acids and diols used are seldom produced. The use of halogen-containing monomers containing reactive double bonds has the disadvantage that these compounds are only present in the compositions in a limited amount, so that the total halogen content of the composition is low and the required flame resistance is difficult to achieve. The addition of liquid non-polymerisable compounds containing halogen- and/or phosphorus, e.g. chloroparaffins, is unsuitable for the manufacture of flame resistant compositions, since these compounds tend to sweat out of mouldings making the surface of the moulded body dull and porous. On the other hand some phosphorus-containing compounds may influence the polymerisation and under certain circumstances prevent hardening from taking place. Also it is only very rarely possible to use inorganic fillers—which increase the heat-conductivity of the compositions and may also improve the flame resistance by generating a gas such as carbon dioxide—in large enough amounts to give a satisfactory flame resistance. Moreover the amount of such additions is limited by the manufacturing and processing conditions used. Also when using glass fibres as a filler the self-extinguishing effect attained by the minerals is strongly reduced.

It has now been found that the flame resistance of heat-curable compositions based on unsaturated polyesters and/or polyether acetals may be adjusted to any desired degree by the addition of certain substances without disadvantageously affecting the further processing of the composition or the physical characteristics of the hardened final products.

According to the present invention therefore there is provided a heat-curable fire-retardant moulding composition comprising an unsaturated polyester and/or polyether acetal, a vinyl monomer copolymerisable therewith, a polymerisation catalyst, active at elevated temperature, a filler and as a fire-retardant additive (A) at least 2% by weight of perchloropentacyclo-$(5,2,1,0^{2,6}, 0^{3,9},0^{5,8})$-decane or 1,3,5 - s - tris-(dihalopropionyl)-hexahydrotriazine or (B) at least 0.2% by weight of certain other chlorine-containing triazine derivatives, more fully described below, or a mixture of a plurality of such compounds, the fire-retardant additives being present in an amount of not more than 30% by weight and the percentages being based on the combined weight of the polyester, the polyether acetal and the monomer.

The triazine compound used is preferably the bromo or chloro compound. Preferably the amount of fire-retardant additive recited sub (A) is between 5 and 20% by weight and that recited sub (B) 2 to 15% by weight. The optimum amount is, however, also dependent on the nature of the composition. The use of mixtures of both types of compounds recited sub (A) and that of compounds recited sub (B) is especially preferred. As a result of the high melting point of the additives (perchloropentacyclodecane melts at 485° C., 1,3,5-s-tris-(dibromopropionyl)-hexahydrotriazine at 178° C., the compound recited in Example 5 at 320° C.) the substances are not sweated out when moulding the compositions at conventional temperatures, so that even surfaces are obtained. The use of the triazine compounds recited sub (A), together with perchloropentacyclodecane has the advantage that by adjusting the amount used the melting point of the mixture of both compounds may be adjusted to any desired and suitable temperature and to the conditions of processing of the composition. A further advantage of the use of such mixture lies in the fact that relatively low amounts of this mixture produce a high degree of flame resistance which is otherwise only attainable by using high proportions of perchloropentacyclodecane alone, which may be uneconomical. If a mixture of both types of additives recited sub (A) is used, the proportion of the triazine compound is generally 10 to 70%, preferably 20 to 50% by weight of the additive mixture. The fire retardant properties may often be improved by the additional use of antimony trioxide. This is of particular importance, since the very good surface leakage strength is almost not impaired by this compound. The amount of antimony trioxide is in general in the range from 25 to 50%, calculated on the weight of the additive according to the invention.

The additives of the invention may, of course, also be used in combination with other flame retardant components, such as compounds containing halogen and/or phosphorus. Suitable compounds are tris-(β-chloroethyl)-phosphate, tris - (dichloropropyl) - phosphate, tris - 2,3-(dibromopropyl)-phosphate, halogenated diphenyl derivatives such as trichlorodiphenyl, tetrabromodiphenyl or pentabromodiphenyl). Of course, there should only be used compounds which do not impair the polymerisation. The additives of the invention may also be added to halogen-containing unsaturated polyesters, thus improving the flame-resistance and generally also raising the halogen-content.

The compounds (B) are new substances and have the formula

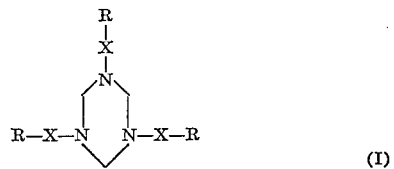
(I)

In this formula X is >C=O or >SO$_2$, while at least one, preferably at least two of the radicals R represent the group

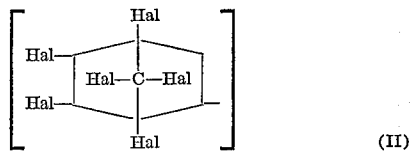
(II)

in which Hal means bromine or preferably chlorine and the remaining residues R represent the group —CH=CH$_2$.

The afore-mentioned compounds (B) are obtained by reacting derivatives of hexahydrotriazine of the formula

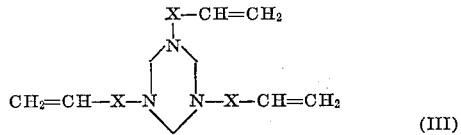
(III)

in which X has the meaning indicated above with at least one mol of hexahalocyclopentadiene the halogen of which having an atomic weight of at least 35 and at most 80. This reaction should occur at a temperature in the range from 80 to 250° C. in an inert solvent, preferably in the resence of a polymerisation inhibitor. Suitable hexahalocyclopentadienes are for example hexabromocyclopentadiene and dibromotetrachlorocyclopentadiene, but preferably hexachlorocyclopentadiene. Mixtures of the afore-mentioned compounds may also be used. The reaction with at least 3 mols and preferably not more than 4 mols of hexahalocyclopentadiene is preferred so as to produce compounds in which the three radicals R are the group (II) in an optimum yield.

Suitably a solution of the reactants in an inert organic solvent is heated in the presence of a polymerisation inhibitor, if desired under super-atmospheric pressure, preferably to a temperature in the range from 90 to 160° C.

Suitable solvents are for example aliphatic hydrocarbons, ethers, ketones, esters, aliphatic alcohols, aromatic hydrocarbons and halogenated aromatic or aliphatic hydrocarbons such as white spirit, n-propanol, iso-butanol, toluene, xylene, mono- and dichlorobenzene, 1-chlorodecane. The hexahydrotriazine derivatives separate at the end of the reaction in crystalline form or may be separated in crystalline form by adding for example petrol ether after having the solvent distilled off depending on the solvent used in the reaction. A conventional amount of polymerisation inhibitor is used, e.g. 0.005 to 0.3%, calculated on the weight of the reactants. Suitable compounds are for example hydroquinone, mono- and di-tert.-butyl-hydroquinone, tert.-butyl-pyrocatechol.

The compound of the Formula I in which all radicals R represent the group (II) and Hal stands for chlorine, contains 59.8% of chlorine and has a melting point of 319 to 320° C. Therefore this compound is particularly suitable as a fire retardant additive to moulding compositions based on unsaturated polycondensation products such as polyesters and/or polyether acetals. Due to its high chlorine content the fire retardant properties of the moulding composition is considerably improved. Moreover the said compound is not exuded on hardening so that it remains in the moulded article in a homogeneous distribution.

The compound of the Formula I in which only two of the radicals represent the group (II) and Hal chlorine, as a slightly smaller chlorine content of 53%. Under the hardening conditions, however, this compound may be copolymerised by its double bond to the polymerisable double bonds of the polycondensation product and the monomer.

Conventional polyether acetals and/or preferably unsaturated polyesters and vinyl monomers can be used in the manufacture of the moulding compositions. For example vinyl monomers such as styrene, diallylphthalate or esters of acrylic or methacrylic acid may be used as may also conventional polymerisation catalysts effective at elevated temperatures, e.g. those active above 65° C. Suitable polyether acetals are for example obtained by adding esters containing polymerisable double bonds and alcoholic hydroxy groups to diallylidene pentaerythritol or by transesterification of two mols of 2-vinyl-5-alkyl-5-hydroxymethyl-1,3-dioxolane with dialkyl esters of dicarboxylic acids and are for example described in British patent specifications 941,423 and 941,424 and in French patent specification 1,384,676 corresponding to British patent specification 1,000,329. Mixing may also be effected in a conventional manner. The composition can be prepared in any form, e.g. granules, long glass fibre compositions, cements or prepregs. The additives may, if desired, also be worked into compositions suitable for the preparation of the heat-curable fire-retardant moulding compositions of the invention by mixing the additive with (a) the polyesters and/or polyether acetals, (b) the polyesters and/or polyether acetals and monomers or (c) the fillers particularly powdery fillers. The moulding materials generally also contain a lubricant such as zinc stearate. As fillers which term is indeed to include reinforcing materials, there may be mentioned textile fibres, glass fibres or powdery substances, especially those of a mineral nature.

The examination of the flame resistance may be carried out according to conventional methods. A test sample is contacted for not more than 3 minutes with a 950° C. hot ignition stick and the product from the loss of weight and spreading out of the flame is formed (cf. examination definitions of the Verein deutscher Elektro-Ingenieure (VDE) 0302/III. 43). Under the indicated conditions the fire-retardant product will quickly extinguish so that the product formed from the loss of weight and spreading out of the flame is rather small. Values of this examination of the glowing resistance of the compositions of Examples 1 to 7 and of compositions analogous to those of Examples 5 to 8 in which the amount of additive has been varied (see below) are contained in columns D and E of the table below. The flame resistance may also be determined as follows: A shape body is exposed by defined distance during 20 seconds to a blast flame (compositions of Examples 1 to 4) or to an electric arc (compositions according and analogous to Examples 5 to 8). After removing the flame the period during which burning of the shaped body continues is determined (in seconds). The results found by this method are contained in column F of the table.

ground kaolin. This composition was moulded on a press at 130° C. and 100 kg./cm.² for 20 sec. to form a base of a high tension switch. The surface leakage strength of the base was degree T 5 according to the test of DIN 53 480.

Example 2

A moulding composition was prepared in a conventional manner from 270 g. of an unsaturated polyester (pre-

| A | B | C | D | E | F |
|---|---|---|---|---|---|
| Type of moulding composition according to example | Compound | Percent by weight [1] | Glowing, mg. cm. | Resistance degree | Period of further burning (sec.) |
| (1) Granulate | None | | 220-0.9 | 3 | 65 |
| Do | P+ | 7.7 | 130-0.5 | 4 | 10 |
| (2) Long glass fibre composition (dry, containing diallyl phthalate) | None | | 450-2.5 | 2 | 90 |
| Do | P/T+ (0.7/0.3) | 13.3 | 180-0.9 | 3 | 26 |
| (3) Long glass fibre composition (wet, containing styrene) | None | | 780-4.2 | 2 | ([4]) |
| Do | P/T (1/1) | 15 | 210-1.1 | 3 | 35 |
| (4) Long glass fibre composition (dry, containing diallyl phthalate) | | | 1,090-3.2 | 2 | 90 |
| Do | T | 8.6 | 280-0.9 | 3 | 20 |
| (5) Granulate | ([2]) | | 140-0.7 | 4 | ([4]) |
| Do | ([2]) | 1.9 | 120-0.5 | 4 | 12 |
| Do | ([2]) | 3.8 | 110-0.5 | 4 | 10 |
| Do | ([2]) | 5.7 | 110-0.5 | 4 | 5 |
| (6) Long glass fibre composition (dry, containing diallyl phthalate) | ([2]) | | 630-2.5 | 2 | ([4]) |
| Do | ([2]) | 3.3 | 170-0.8 | 3 | ([5]) |
| Do | ([2]) | 6.6 | 150-0.8 | 3 | ([5]) |
| Do | ([2]) | 8.3 | 110-0.6 | 4 | ([5]) |
| (7) Long glass fibre composition (wet, containing styrene) | ([2]) | | 780-2.8 | 2 | ([5]) |
| Do | ([2]) | 2.5 | 320-1.0 | 3 | ([5]) |
| Do | ([2]) | 6.2 | 170-0.6 | 3 | ([5]) |
| Do | ([2]) | 7.5 | 160-0.6 | 4 | ([5]) |
| (8) Long glass fibre composition (wet, containing styrene) | ([3]) | 2.0 | 280-1.4 | 3 | ([5]) |

[1] Calculated on the sum of resin and monomers.
[2] According to Example 5.
[3] According to Example 8.
[4] Not extinguished.
[5] Extinguished.

+P=Perchloropentacyclo-$(5,2,1,0^{2,6},0^{3,9},0^{5,8})$-decane.
T=1,3,5-s-tris-(dibromopropionyl)-hexahydrotriazine.

As is evident from the values the flame resistance of the compositions is materially improved by the compounds of the invention. Even the more combustible long glass fibre types which generally have a glowing resistance of degree 2 only became flame resistant. The surface leakage streength is not decreased.

The 1,3,5 - s - tris-(dihalopropionyl)hexahydrotriazines are new compounds, which may be produced by halogenation of the 1,3,5-s-tris-acryloyl-hexahydrotriazine. Thus the 1,3,5 - s - tris-(dibromopropionyl)-hexahydrotriazine may for example be obtained as follows: A mixture of 480 g. of bromine and 150 ml. of chloroform is added drop-wise during 2 hours to a solution of 250 g. of 1,3,5-s-tris-acryloyl-hexahydrotriazine in one litre of chloroform at 60 to 65° C. while stirring well. After cooling, the separated white precipitation is filtered with suction, washed with chloroform and dried. 595 g. (82% of the theory) of 1,3,5-s-tris-(dibromopropionyl)-hexahydrotriazine are obtained, which melts at 178° C. after recrystallisation from formic acid. Further amounts of the said compound may be recovered from the mother liquor, so that the yield is nearly quantitative. The substance is soluble at room temperature in dimethylsulfoxide or dimethylformamide, and for example in chloroform at elevated temperatures.

Example 1

A granular, moulding composition was produced in a conventional manner from 250 g. of an unsaturated polyester (produced from 30 mol percent of terephthalic acid, 20 mol percent of maleic anhydride and 50 mol percent of propylene glycol-1,2 according to the melt-condensation-process, acid value about 30), 20 g. of perchloropentacyclodecane, 10 g. of antimony trioxide, 10 g. of diallyl phthalate, 10 g. of zinc stearate, 8 g. of tert.-butyl perbenzoate, 300 g. of ground limestone and 400 g. of pared from 20 mol percent of phthalic anhydride, 30 mol percent of maleic anhydride, 50 mol percent of propylene glycol-1,2 according to the melt-condensation-process, acid value about 30), 30 g. of diallyl phthalate, 28 g. of perchloropentacyclodecane, 12 g. of 1,3,5-s-tris-(dibromo-propionyl)-hexahydrotriazine, 6 g. of antimony trioxide, 10 g. of zinc stearate, 10 g. of tert.-butyl perbenzoate, 20 g. of magnesium oxide, 320 g. of ground limestone and 300 g. of volanized staple glass fibre having a cut length of 13 mm. This composition was moulded for one minute at 160° C. and 150 kg./cm.² to form a switch lever. The shaped body had a surface leakage strength of degree T 5 according to the test of DIN 53 480.

Example 3

A moulding composition was prepared in a conventional manner from 400 g. of a styrene-containing unsaturated polyester (prepared from 20 mol percent of phthalic anhydride, 30 mol percent of maleic anhydride, 50 mol percent of propylene glycol-1,2, styrene content 30% acid value about 30), 30 g. of perchloropentacyclodecane, 30 g. of 1,3,5-s-tris-(dibromopropionyl)-hexahydrotriazine, 15 g. of antimony trioxide, 10 g. of tert.-butylperbenzoate, 10 g. of zinc stearate, 30 g. of magnesium oxide, 200 g. of ground limestone and 300 g. of volanized staple glass fibres having a cut length of 13 mm. From this composition a cable conduit was moulded at 150° C., 100 kg./cm.² and a period of stay of 2 minutes. The cable conduit obtained had a surface leakage strength of degree 5.

Example 4

300 g. of a grindable unsaturated polyester having an acid value of 30 (prepared from 50 mol percent of propylene glycol-1,2, 20 mol percent of phthalic anhydride and 30 mol percent of maleic anhydride) were preheated in a mixer heated to 70° C. with 10 g. of zinc stearate, 300 g. of ground limestone and 30 g. of 1,3,5-s-tris-(dibromopropionyl)-hexahydrotriazine. After the addition of 50 g. of diallyl phthalate and 10 g. of tert.-butyl perbenzoate the material became pasty and had a low viscosity. Then 300 g. of volanized glass fibres (cut length 13 mm.) were added. The material was mixed thoroughly until it was completely impregnated, then removed from the kneader and cooled. The ductile composition was moulded on a press at 160° C. and 100 kg./cm.² for one minute to form a cover box.

Example 5

250 g. of an unsaturated polyester (produced from 25 mol percent terephthalic acid, 25 mol percent maleic anhydride and 50 mol percent propylene glycol-1,2 according to the melt-condensation process, acid value about 30) 10 parts of a compound of the Formula I in which all three radicals R are the group (II) (i.e. the compound 1,3,5 - s - tris - (1,4,5,6,7,7-hexachlorobicyclo-[2,2,1]-5-heptene-carboxo-2)-hexahydrotriazine), 4 g. of antimony trioxide, 10 g. of diallyl phthalate, 10 g. of zinc stearate, 8 g. of benzoylperoxide, 208 g. of ground limestone and 500 g. of ground kaolin were mixed in a dry state in an unheated kneader and processed to smooth sheets on heated rollers. The sheets solidified after short storage at room temperature and was ground on a cross-beater mill. The granulate was moulded on a press at 140° C. and a pressure of 140 kg./cm.² for 30 seconds to form plates of the size of 150 x 150 x 3 cm. The surface leakage strength was degree T 5 according to the test of DIN 53 480.

The compound of the Formula I was produced by heating 100 g. of 1,3,5-s-tris-acryloyl-hexahydrotriazine (0.4 mol) and 327.6 g. of hexachlorocyclopentadiene (1.2 mols) in 800 g. of xylene in the presence of 0.2 g. of hydroquinone to 130 to 140° C. for four hours while stirring and producing carbon dioxide. A clear solution was obtained which was freed from solvent in vacuo. The yellowish viscous residue was crystallized by adding 500 ml. of petrol ether. 318 g. of a crystalline colourless product melting at 315 to 318° C. were obtained, corresponding to 74.4 percent of the theory. The compound melted at 319 to 320° C. after recrystallisation from acetic acid ethyl ester.

Example 6

250 g. of an unsaturated polyester (produced from 20 mol percent of phthalic anhydride, 30 mol percent of maleic anhydride and 50 mol percent of propylene glycol-1,2, according to the melt-condensation process, acid value about 35) were mixed with 50 g. of diallyl phthalate, 25 g. of the hexahydrotriazine derivative recited in Example 5, 8 g. of antimony trioxide, 10 g. of zinc stearate, 10 g. of tertiary butyl perbenzoate, 20 g. of magnesium oxide and 332 g. of ground limestone in a mixer heated to 80° C., until a paste of low viscosity was formed and 300 g. of glass fibres reacted with silanes when then added. The mixture was homogenized, removed from the kneader and allowed to cool. The voluminous ductile composition was moulded on a press at 160° C. and 100 kg./cm.² for 1 minute to form a base of a switch, the surface leakage strength of which was degree T 5 to the test of DIN 53 480.

Example 7

400 g. of a styrene-containing unsaturated polyester (produced in two stages according to the process of British Patent 968.910 from 20 mol percent of phthalic anhydride, 30 mol percent of maleic anhydride, 50 mol percent of propylene glycol-1,2 and 20 g. of dicyclopentadiene per mol of acid, acid value about 25, styrene content about 35%) were mixed in an unheated mixture with 30 g. of the hexahydrotriazine derivative mentioned in Example 5, 12 g. of antimony trioxide, 10 g. of tertiary butyl perbenzoate, 10 g. of zinc stearate, 30 g. of magnesium oxide and 208 g. of ground limestone until a paste was formed. 300 g. of volanized staple glass fibre was then added to the composition. Mixing was continued until the fibre was even and well wetted and the composition was then stored in closed containers for some days at room temperature. Then switch boxes were prepared (moulding conditions: 3 minutes at 150° C. and 200 kg./cm.²).

Example 8

400 g. of a styrene-containing unsaturated polyester (produced from 20 mol percent of phthalic anhydride, 30 mol percent of maleic anhydride and 50 mol percent of propylene glycol-1,2, acid value 28, styrene content 32%) were processed with 22 g. of 1,3,5-s-1-acryloyl-3,5-bis-(1,4,5,6,7,7-hexachlorodicyclo-[2,2,1]-5 - heptene-carboxo-2)-hexahydrotriazine (III),12 g. of antimony trioxide, 5 g. of tertiary butyl perbenzoate, 5 g. of benzoyl peroxide, 15 g. of zinc stearate, 30 g. of magnesium oxide, 95 g. of ground limestone and 160 g. of kaolin to a long glass fibre composition according to the method of Example 7. Shaped bodies produced therefrom had a surface leakage strength of degree T 5 according to the test of DIN 53 480.

Compound (III) was produced by reacting 25 g. of 1,3,5-s-tris-acryloyl-hexahydrotriazine with 54.6 g. of hexachlorocyclopentadiene in 200 ml. of xylene in the presence of 0.1 g. of monotertiary butyl hydroquinone during four hours at 135 to 140° C. while stirring. After cooling down a clear yellow solution was obtained from which the solvent was distilled off in vacuo. A yellow, highly viscous oil was obtained as a residue to which 200 ml. of petrol ether were added and which mixture was then allowed to stand overnight at room temperature. The product solidified to a colourless crystallized substance which was suction filtered and washed with 50 ml. of petrol ether. The yield was 75 g. (corresponding to 95.6% of the theory). The product melted at 202 to 204° C., and had the Formula I in which two of the radicals R are the group (II).

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A composition suitable for the preparation of a heat-curable fire-retardant moulding composition consisting essentially of at least one fire-retardant additive in admixture with a powdery inorganic filler, said fire-retardant additive being a hexahydrotriazine derivative selected from the group consisting of (A) a mixture of 1,3,5-s-tris (dihalopropionyl)-hexahydrotriazine with perchloropentacyclo - (5,2,1,0$^{2,6}$,0$^{3,9}$,0$^{5,8}$) - decane, (B) a hexahydrotriazine derivative of the formula

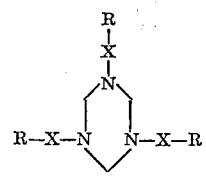

in which X is a member selected from the group consisting of >C=O and >SO$_2$ and at least one of the radicals R is the group

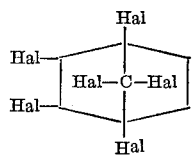

Hal being bromine or chlorine and the other R radicals being the group —CH=CH$_2$(C) a mixture of 1,3,5-s-tris-(dihalopropionyl) - hexahydrotriazine with component (B) and (D) a mixture of a plurality of components (A) and (B).

References Cited

UNITED STATES PATENTS 2,615,887  10/1952  Zerner et al. _____ 260—248

FOREIGN PATENTS 1,360,097  3/1964  France.
1,182,810  12/1964  Germany.

MAYER WEINBLATT, Primary Examiner

U.S. Cl. X.R.

106—15; 260—248